Figure 1:
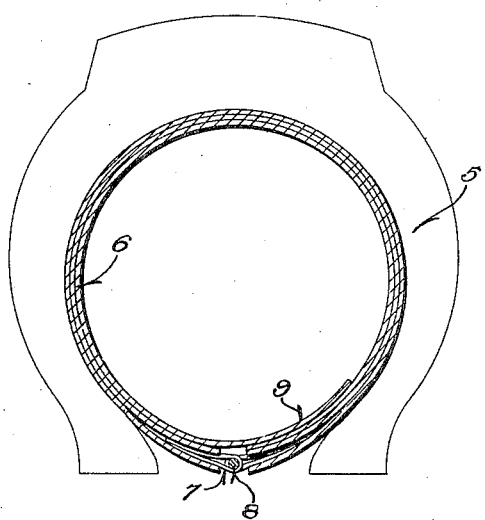

Apr. 17, 1923.

L. T. PEFFER ET AL

TIRE BOOT

Filed Feb. 10, 1922

1,451,712

Witness!
Erwin B. Eiring

Inventors!
Lloyd T Peffer
Thomas E Peffer
By Young Young
Attorneys!

Patented Apr. 17, 1923.

1,451,712

UNITED STATES PATENT OFFICE.

LLOYD T. PEFFER AND THOMAS E. PEFFER, OF WAUKESHA, WISCONSIN.

TIRE BOOT.

Application filed February 10, 1922. Serial No. 535,552.

*To all whom it may concern:*

Be it known that we, LLOYD T. PEFFER and THOMAS E. PEFFER, both citizens of the United States, and residents of Waukesha, in the county of Waukesha and State of Wisconsin, have invented certain new and useful Improvements in Tire Boots; and we do hereby declare that the following is a full, clear, and exact description thereof.

Our invention relates to a tire boot which is adapted to fit within the outer casing of an automobile tire, or the like, and serve as a reinforcement of the same to prevent blow outs.

The general object of the invention is to provide a device of this kind which will withstand the entire pressure exerted by the air within the inner tube, thus relieving the pressure upon the outer casing, and consequently permitting the use of a casing which is torn or rim cut, or damaged in a manner which hitherto has rendered the casing unsuitable for anything but junk.

With the above general in view, our invention consists in certain details of construction which will be described in connection with the accompanying drawing and subsequently claimed.

Figure 2:
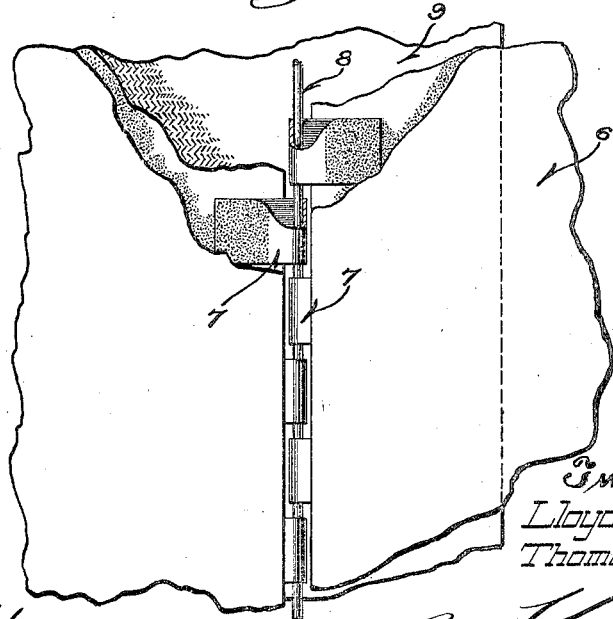

In the drawing,

Figure 1 represents a cross sectional view of our invention, as applied to the tire, and Figure 2 represents a fragmentary plan view with parts broken away showing the manner of securing the same within the casing.

Referring in detail to the drawing, the numeral 5 designates the outer casing of a pneumatic tire, within which our improved tire boot is inserted. The boot comprises a plurality of superposed flexible strips 6, preferably composed of fabric vulcanized together, and having loops 7 vulcanized between the layers and projecting beyond the edges thereof.

These loops are so disposed that when the boot is inserted within the casing, with the edges adjacent each other on the rim side of the tire, the successive loops extend alternately from the two edges of the boot, and are brought into registry with each other so as to form a practically continuous passage way around the inside of the strip thru which a steel wire 8 may be inserted to form a seam which locks the edges of the boot together.

It will be seen, therefore, that when the inner tube is inserted within the tire boot and the edges of the latter locked together in the manner described, the pressure of the inner tube will be completely retained by the liner, thus relieving all the pressure from the outer casing and preventing the possibility of a blow out, no matter how bad the condition of the casing may be.

It will also be noted that one edge of the inner ply of fabric is extended across the seam thus formed, and beyond the other edge of the fabric, as indicated at 9. This prevents the tube from becoming worn or damaged by coming in contact with the cracks formed between the loops and the edges of the fabric.

While we have shown and described specifically the detailed structure by means of which the principles of our invention may be carried out, it will be understood that various modifications may be made therein, without departing from the scope of the invention, as defined by the claims.

We claim:

A tire boot comprising a plurality of layers of flexible material adapted to encircle a tire with the edges of the boot juxtaposed, a plurality of looped strips having their ends secured between the layers and having their looped portions projecting outwardly from said juxtaposed edges with the loops projecting alternately from opposite edges to provide a staggered arrangement of alining loops when the boot is in position upon a tire, a substantially rigid member insertable through the alined loops, and an inner protecting flap extending across the juxtaposed edges, said layers and loops being vulcanized to form a substantially unitary structure.

In testimony that we claim the foregoing we have hereunto set our hands at Waukesha, in the county of Waukesha and State of Wisconsin.

LLOYD T. PEFFER.
THOMAS E. PEFFER.